United States Patent
Han et al.

(10) Patent No.: US 8,785,024 B2
(45) Date of Patent: Jul. 22, 2014

(54) COMBINATION OF HEAT PIPE AND LOUVERED FINS FOR AIR-COOLING OF LI-ION BATTERY CELL AND PACK

(75) Inventors: Taeyoung Han, Bloomfield Hills, MI (US); Kuo-Huey Chen, Troy, MI (US); Bahram Khalighi, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 594 days.

(21) Appl. No.: 12/914,062

(22) Filed: Oct. 28, 2010

(65) Prior Publication Data

US 2011/0206965 A1 Aug. 25, 2011

Related U.S. Application Data

(60) Provisional application No. 61/307,161, filed on Feb. 23, 2010.

(51) Int. Cl.
*H01M 10/50* (2006.01)

(52) U.S. Cl.
USPC .................. 429/120; 165/104.19; 165/104.26

(58) Field of Classification Search
USPC .......................... 429/120; 165/104.19, 104.26
See application file for complete search history.

(56) References Cited

U.S. PATENT DOCUMENTS

| | | | |
|---|---|---|---|
| 6,106,972 A * | 8/2000 | Kokubo et al. | 429/120 |
| 6,569,556 B2 | 5/2003 | Zhou et al. | |
| 2010/0134981 A1 * | 6/2010 | Whittum et al. | 361/715 |

FOREIGN PATENT DOCUMENTS

| | | |
|---|---|---|
| CN | 1980560 A | 6/2007 |
| CN | 101074855 A | 11/2007 |
| CN | 101083888 A | 12/2007 |
| CN | 201152618 Y | 11/2008 |
| JP | 2006155989 A | 6/2006 |

OTHER PUBLICATIONS

Machine translation of JP 2006-155989 obtained Apr. 2013.*
Machine translation of CN 101074855, obtained Jun. 7, 2013.*
Institute of Scientific and Technical Information of China, Chongqing Branch, Heat pipe design research and engineer application; Published Scientific and Technical Documentation Press, Chongqing Division on May 31, 1981; pp. 1-239.
Qiao Jiping et al., Preparation handbook of physics of junior high school; People's Education Press, May 31, 1990; pp. 1-624.

* cited by examiner

*Primary Examiner* — Nicholas P D'Aniello
(74) *Attorney, Agent, or Firm* — Dinsmore & Shohl LLP

(57) ABSTRACT

A heat pipe is described. The heat pipe includes a heat pipe body containing a working fluid; and a louvered cooling fin adjacent to one end of the heat pipe body, the louvered cooling fin extending outward from a surface of the heat pipe body. Air-cooled battery packs containing the heat pipe are also described.

17 Claims, 3 Drawing Sheets

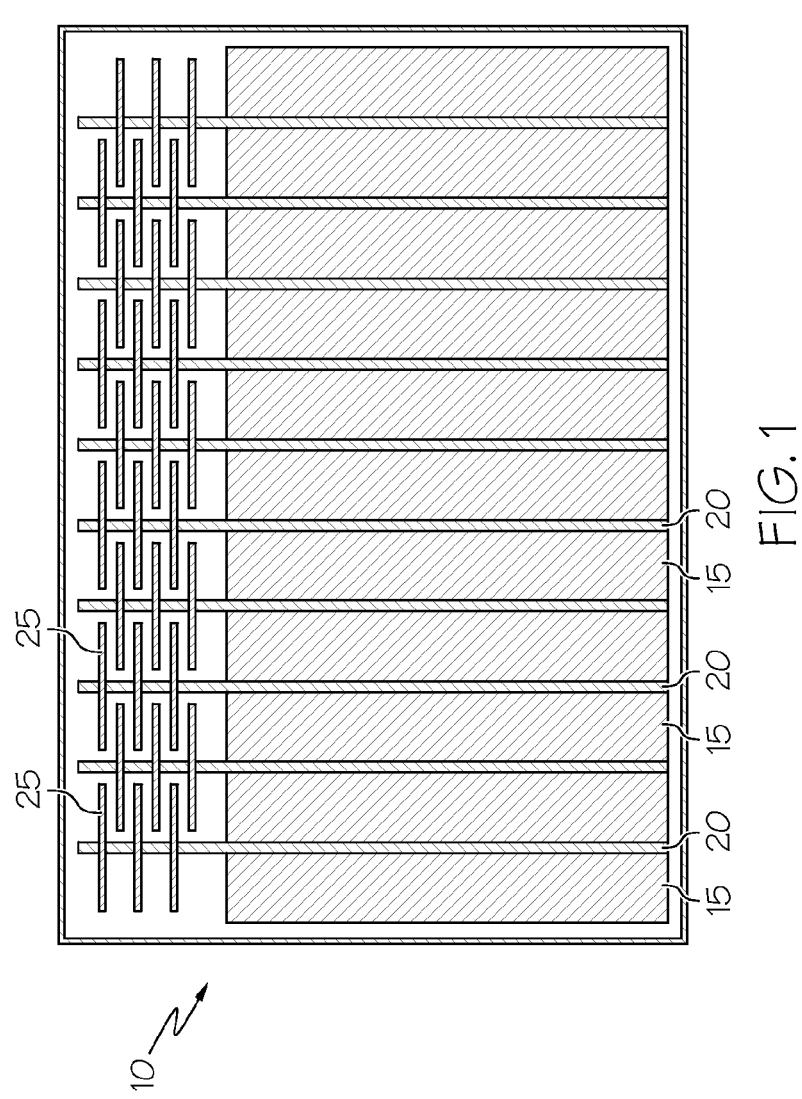
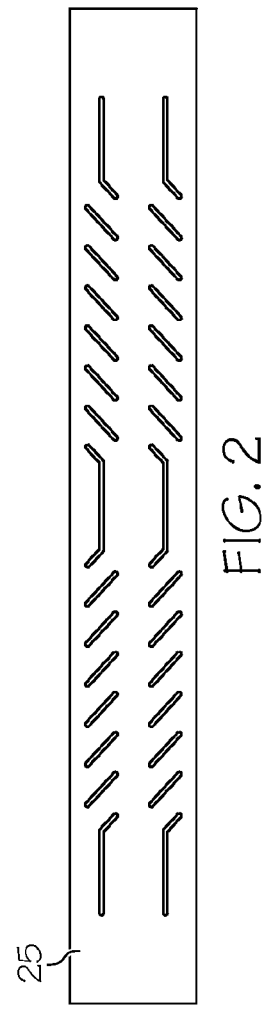

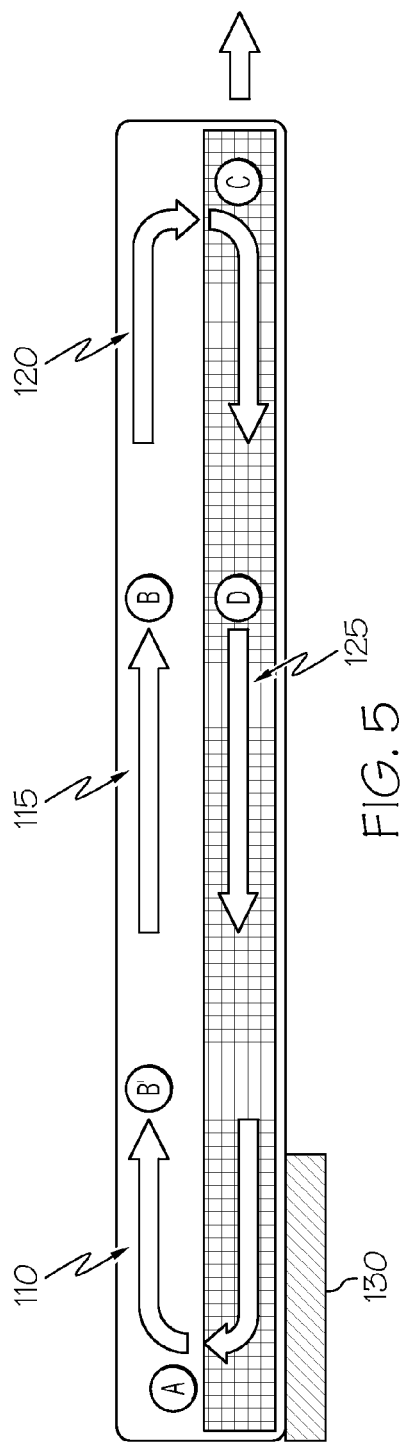
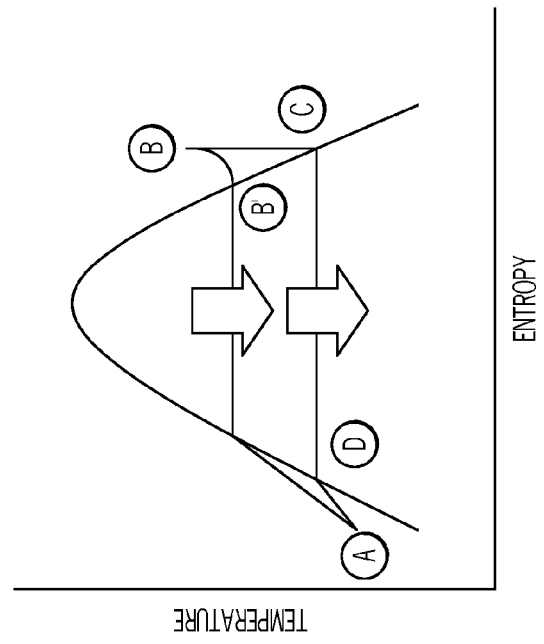
FIG. 5
FIG. 6 ion of heat pipe and louvered fins for air-cooling of li-ion battery cell and pack

STATEMENT OF RELATED CASES

This application claims the benefit of Provisional Application Ser. No. 61/307,161, filed Feb. 23, 2010, entitled Combination Of Heat Pipe And Louvered Fins For Air-Cooling Of Li-Ion Battery Cell And Pack, which is incorporated herein by reference.

FIELD OF THE INVENTION

A combination of heat-pipe and louvered fins can be used to provide low power consumption and improved heat transfer performance for an optimum desired temperature range and to reduce uneven temperature distribution using air for Li-Ion battery cells and pack.

BACKGROUND

Battery temperature greatly affects the performance, safety, and life of Li-Ion batteries in hybrid vehicles under various driving conditions. As a result, automakers and battery suppliers are paying increased attention to thermal management for Li-Ion batteries. Driving conditions and the type of heating and cooling can create an uneven temperature distribution in a battery pack. This uneven temperature distribution can lead to electrically unbalanced modules, and thus to lower performance and shorter battery life. Battery thermal management systems play a significant role in Hybrid Electric Vehicle (HEV) applications by addressing the Li-Ion battery thermal safety, in addition to improving performance and extending the battery cycle life.

The magnitude of the battery heat generation rate from the modules in a battery pack affects the size and design of the battery thermal management system. Battery heat generation depends on the magnitude of the cell internal resistance and the thermodynamic heat of the electrochemical reaction. Thus, the heat generation rate depends on the discharge/charge profile and the cell's state of charge and temperature. In order to achieve optimum performance from a battery, it is desirable to operate the battery in a desired temperature range and to reduce uneven temperature distribution.

Poor thermal management can lead to a reduction in battery performance, and thus to a substantial increase in cost, reduced cycle and calendar life, and an increased chance of abuse conditions. One current approach to battery cooling uses indirect liquid cooling. However, these systems are heavy, and costly, and they have potential quality problems associated with leakage. Another current approach uses air cooling. However, these systems do not have sufficient cooling capacity, and they require a large air flow rate, which introduces noise and vibration problems in the cooling system. Consequently, air cooling systems provide a limited cooling performance. However, a thermal management system using air as the heat transfer medium is less complicated than a system using liquid for cooling/heating.

SUMMARY OF THE INVENTION

In one aspect, the invention relates to a heat pipe. In one embodiment, the heat pipe includes a heat pipe body containing a working fluid; and a louvered cooling fin adjacent to one end of the heat pipe body, the louvered cooling fin extending outward from a surface of the heat pipe body.

Another aspect of the invention is an air-cooled battery pack. In one embodiment, the air-cooled battery pack includes at least two battery cells; and a heat pipe positioned between the at least two battery cells, the heat pipe including a heat pipe body containing a working fluid; and a louvered cooling fin adjacent to one end of the heat pipe body, the louvered cooling fin extending outward from a surface of the heat pipe body, a portion of the heat pipe body containing the louvered cooling fin defining a condenser section, whereby air flowing across the louvered cooling fin cools the battery pack.

BRIEF DESCRIPTION OF THE DRAWINGS

FIG. 1 is a cross-sectional illustration of a battery pack module according to one embodiment of the present invention.

FIG. 2 is a view of one embodiment of the louvered cooling fin of the present invention.

FIG. 5 is an illustration of the heat pipe phase change cycle.

FIG. 6 is a graph illustrating the heat pipe phase change cycle.

DETAILED DESCRIPTION OF THE INVENTION

Figure 4:
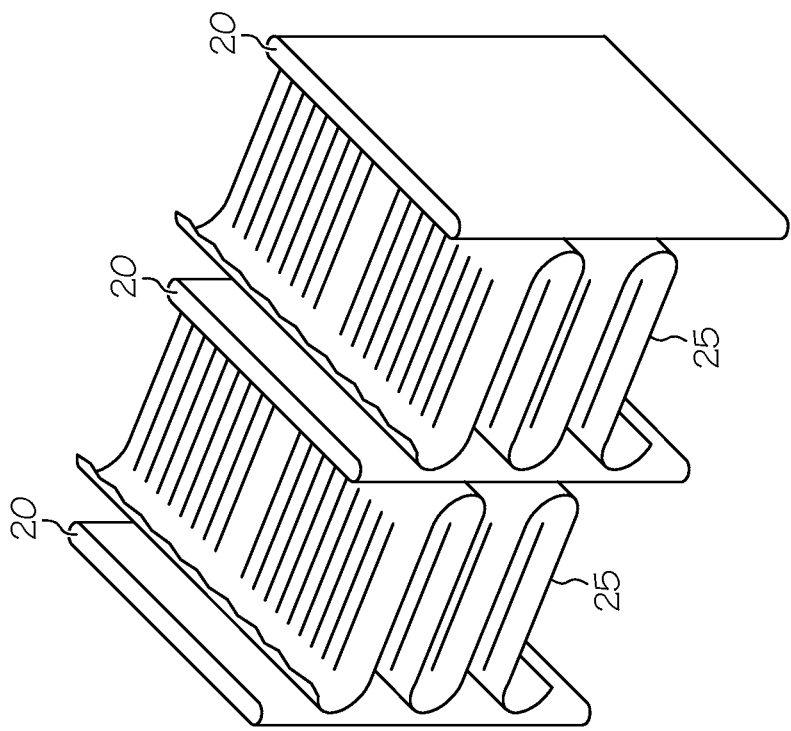
FIG. 4 is an illustration of a portion of another embodiment of the heat pipe and cooling fins.

This invention provides uniform heat transfer on the prismatic battery cells by using a heat pipe combined with air cooling for the condenser. The innovative cooling configuration minimizes temperature non-uniformity within the cells and helps to produce the desired optimum cell temperatures within the pack. This invention allows for improved cooling performance with minimal power consumption. It can be used with various module configurations to provide battery pack cooling strategies for different battery pack arrangements.

Li-Ion batteries operate best at temperatures between about 25° C. and about 40° C., and at these temperatures batteries achieve a good balance between performance and life. It is desirable to have a temperature distribution of less than about 5° C. from module to module. In order to achieve the cooling performance under various heat loads, a flat panel heat pipe with a louvered fin configuration at the condenser is used to provide sufficient heat rejection from the condenser. With a high heat transfer louvered fin plate and the latent heat of vaporization of the heat pipe, the design can provide fairly constant wall temperatures at the cell interface with the heat pipe, which can provide more uniform cell and pack temperatures. The heat pipe can be designed for a specific operating temperature that satisfies the optimum cell operating temperatures, and also the constant temperature of the heat pipe that provides the best performance for even cell temperature distribution.

The innovative inlet design also produced fairly uniform battery temperatures with less than about 5° C. variation within the module. It is challenging to achieve a battery temperature with less than about 5° C. variation due to highly non-uniform heat generation within the battery. In addition, the coolant flow temperature increases as it picks up the heat from the battery. As a result, the coolant air flow temperature from the inlet to the exit varies considerably. The heat pipe design prevents this problem and provides the same heat transfer rate for each battery, making it possible to achieve more uniform temperatures. Furthermore, the very high heat transfer rate of the heat pipe helps to achieve the optimum battery temperature quickly when the batteries generate high heat.

The heat pipe with louvered fin configuration can provide low pumping power requirements with improved battery cooling performance. It allows fairly simple manifold design and fairly simple air flow management.

With a high heat transfer rate louvered fin plate and the latent heat of vaporization of the heat pipe, the design can provide fairly constant wall temperatures at the cell interface with the heat pipe, which can provide more uniform cell and pack temperatures.

FIG. 1 shows a battery pack module 10 with a plurality of battery cells 15 separated by heat pipes 20. The heat pipes can be placed between every cell (i.e., cell, heat pipe, cell, heat pipe, etc), or between every other cell (i.e., two cells, heat pipe, two cells, heat pipe, etc.), or between three or more cells (3 (or more) cells, heat pipe, 3 (or more) cells, heat pipe, etc.), depending on the cooling capacity of the heat pipe and the cooling fins. The heat pipes 20 are longer than the battery cells 15 and extend beyond them. For example, if the battery cell is about 150 mm, the heat pipe could extend an additional 30 to 50 mm.

The heat pipes 20 have multiple cooling fins 25 at one end to aid in cooling. The cooling fins 25 are louvered to improve cooling, as shown in FIG. 2. The louver length and pitch can be varied to optimize cooling. The design will depend on the air flow rate and the required cooling capacity.

The length of the louvered cooling fins 25 depends on the thickness of the battery cell and whether the heat pipes are placed between every cell or every other cell. If the heat pipes are between every cell, the width of each side of the louvered fin has to be less than the thickness of one battery cell, while if they are between every other cell, the width of each side is less than the thickness of two battery cells. The cooling fins are typically perpendicular to the heat pipe to provide minimum packaging space.

The louvers significantly reduce the number of fins required to provide the same amount of cooling so that the length of the condenser can be reduced compared to a condenser without louvered fins. The length of the condenser section can be optimized based on the heat transfer rate of the louvered fins. The condenser length is desirably less than about 30% of the battery length, or less than about 25%, or about 10 to about 20%.

The cooling fins 25 are typically made of aluminum or copper. The louvers can be formed by stamping. The cooling fins are typically attached to the heat pipe by aluminum brazing technology.

Desirably, the louvered cooling fins from one heat pipe are intermeshed with the louvered cooling fins from an adjacent heat pipe, as shown in FIG. 1. By intermeshed with, we mean that the louvered cooling fins of one heat pipe extend outward from the heat pipe body and are positioned between the louvered cooling fins extending outward from the adjacent heat pipe.

Figure 3:
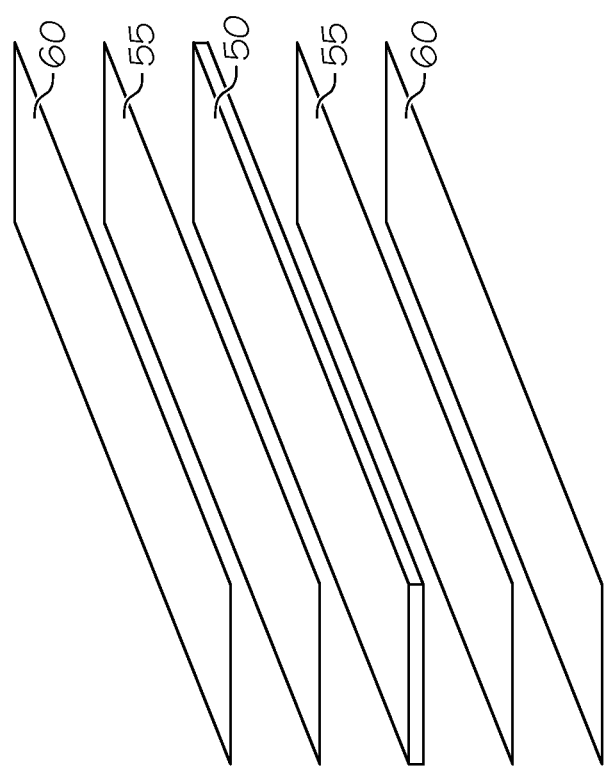
FIG. 3 is an illustration of the structure of a heat pipe.

The structure of the heat pipe is shown in FIG. 3. There is a wick 50 with pressure withstanding spacers 55 on either side, and a container 60 on the outside. The fluid flows though this structure. The heat pipe for this application is typically very thin, for example, less than about 1 mm.

FIG. 4 shows the direction of the air flow across the cooling fins 25. The cross section of the louvers is shown in FIG. 2, where the air flow is from left to right. Air-cooled battery packs have several advantages over liquid-cooled battery packs. They are less complicated because they do not require a special cooling loop and radiator. In addition, they are cleaner because they do not use liquid coolant.

FIGS. 5-6 are an illustration of the heat pipe phase change cycle. The heat pipe includes a heat absorbing section 110, a vapor flow section 115 for flow of vaporized working fluid, a heat dissipating section 120, and a liquid flow section 125 for flow of condensed working fluid. Heat is absorbed from heat source 130. From Point A to Point B', the heat is applied to an evaporator that vaporizes the working fluid in the heat pipe to a vapor. From Point B to Point C, the vapor pressure drives the vapor through an adiabatic section to a condenser. From Point C to Point D, the vapor condenses, releasing heat to a heat sink. From Point D to Point A, capillary pressure by the wick pumps the condensed fluid into the evaporator section.

The design of the present invention can provide improved cooling compared with an air cooling channel design with multiple pin fin configuration. A pin fin cooling channel has multiple cylindrical pins that extended between two base plates. The pin fin cooling channels increases the surface area and also the local heat transfer rate, but they also introduce a large pressure drop along the cooling channel due to flow separations behind the pin fins. Temperatures were calculated from the conservation of the momentum and the energy equations solved by commercial CFD (Computational Fluid Dynamics) software for a battery pack with a total heat generation of 1500 W, an air flow rate of 200 m$^3$/h, and an inlet temperature of 303 K, as shown in Table 1. The heat pipe with louvered cooling fin design produced lowered temperatures and less temperature variation.

TABLE 1

|  | Cooling Channel Design | Heat Pipe Design |
|---|---|---|
| Average Cell Temperature (K) | 324.1 | 304.0 |
| Maximum Cell Temperatuere (K) | 325.1 | 304.5 |
| Minimum Cell Temperature (K) | 319.3 | 303.3 |
| Delta T within the Cell (K) | 5.8 | 1.2 |

The heat pipe can be designed for a specific operating temperature that satisfies the optimum cell operating temperatures and also the constant temperature of the heat pipe provides the best performance for even cell temperature distribution.

Table 2 identifies examples of suitable working fluids for heat pipes for battery applications with battery operating temperatures of about 20 to about 40° C. However, other working fluids having an appropriate useful operating range could also be used, if desired.

TABLE 2

| MEDIUM | MELTING PT. (° C.) | BOILING PT. at ATM pressure (° C.) | USEFUL RANGE (° C.) |
|---|---|---|---|
| Acetone | −95 | 57 | 0 to 120 |
| Methanol | −98 | 64 | 10 to 130 |
| Flutec PP2 | −50 | 76 | 10 to 160 |
| Ethanol | −112 | 78 | 0 to 130 |

The goal of a thermal management system is to maintain a battery pack at an optimum average temperature with only small variations between the modules and within the pack. A thermal management system using the heat pipe can provide an excellent thermal environment for Li-Ion battery cells and the pack. It can provide a desired optimum temperature range and also reduce uneven temperature distribution within the pack. Desirably, the battery thermal management system should be able to maintain the desired uniform temperature in a pack by rejecting heat in hot climates and adding heat in cold climates. A thermal management system can use air for heat/cooling/ventilation, liquid for cooling/heating, or a combination of these methods. The thermal management system can be passive (i.e., only the ambient environment is used) or active (i.e., a built-in source provides heating and/or cooling at extremely cold or extremely hot temperatures).

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

We claim:

1. At least two heat pipes wherein each of said heat pipes further comprises:
    a heat pipe body containing a working fluid; and
    at least two louvered cooling fins, wherein each of said fins further comprises a set of slanted louvers, adjacent to one end of the heat pipe body, each of the louvered cooling fins extending outward from a surface of the heat pipe body;
    and wherein said at least two louvered cooling fins of a first heat pipe are intermeshed with the at least two louvered cooling fins of a second heat pipe so that the fins are parallel to each other.

2. The heat pipes of claim 1 wherein the heat pipe bodies are flat.

3. The heat pipes of claim 1 wherein at least one louvered cooling fin extends from a front surface of each heat pipe body and at least one louvered cooling fin extends from a back surface of each heat pipe body.

4. The heat pipes of claim 1 wherein the louvered cooling fins are perpendicular to the heat pipe bodies.

5. The heat pipes of claim 1 wherein the louvered cooling fins are made of aluminum or copper.

6. An air-cooled battery pack comprising:
    at least two battery cells; and
    at least two heat pipes positioned between the at least two battery cells, each heat pipe comprising:
    a heat pipe body containing a working fluid; and
    at least two louvered cooling fins, wherein each of said fins further comprises a set of slanted louvers, adjacent to one end of the heat pipe body, each of the louvered cooling fins extending outward from a surface of the heat pipe body, a portion of each heat pipe body containing the louvered cooling fins defining a condenser section;
    whereby air flowing across the louvered cooling fins cools the battery pack;
    wherein there are at least two cooling fins on facing surfaces of adjacent heat pipes and wherein the at least two louvered cooling fins of one heat pipe are intermeshed with the at least two louvered cooling fins of the adjacent heat pipe so that the fins are parallel to each other.

7. The battery pack of claim 6 wherein the heat pipe bodies are flat.

8. The battery pack of claim 6 wherein at least one louvered cooling fin extends from a front surface of each heat pipe body and at least one louvered cooling fin extends from a back surface of each heat pipe body.

9. The battery pack of claim 6 wherein each louvered cooling fin is perpendicular to the heat pipe body it extends from.

10. The battery pack of claim 6 wherein a temperature variation in the battery pack is less than about 5° C.

11. The battery pack of claim 6 wherein there are heat pipes between every battery cell.

12. The battery pack of claim 6 wherein a width of each louvered cooling fin is less than a thickness of the battery cell.

13. The battery pack of claim 6 wherein there are heat pipes between every other battery cell.

14. The battery pack of claim 13 wherein a width of each louvered fin is less than twice a thickness of the battery cell.

15. The battery pack of claim 6 wherein a length of the condenser section is less than about 30% of a length of the battery cell.

16. The battery pack of claim 6 wherein each louvered cooling fin is made of aluminum or copper.

17. A battery pack comprising:
    at least two battery cells; and
    at least two adjacent heat pipes positioned between the at least two battery cells wherein each heat pipe contains a working fluid; and
    at least two louvered cooling fins, wherein each of said louvered cooling fins further comprises a set of slanted louvers, adjacent to one end of the heat pipe body, each of the louvered cooling fins extending outward from a surface of the heat pipe body;
    wherein the at least two louvered cooling fins of one heat pipe are intermeshed with the at least two louvered cooling fins of the adjacent heat pipe so that the fins are parallel to each other.

* * * * *